United States Patent

Ogi

[11] Patent Number: 4,605,461
[45] Date of Patent: Aug. 12, 1986

[54] METHOD OF TRANSFERRING A RETROREFLECTIVE PATTERN ONTO A FABRIC

[75] Inventor: Hisao Ogi, Shiga, Japan

[73] Assignee: Ide Idustries Limited, Suzaku, Japan

[21] Appl. No.: 678,825

[22] Filed: Dec. 6, 1984

[30] Foreign Application Priority Data

Dec. 15, 1983 [JP] Japan .................. 58-237243

[51] Int. Cl.⁴ .................. B44C 1/16; B44C 1/165; B32B 31/00; D03D 3/00
[52] U.S. Cl. .................. 156/233; 156/234; 156/239; 156/241; 156/249; 156/289; 156/298; 156/254; 428/156; 428/241; 428/283; 428/325
[58] Field of Search ............. 156/233, 234, 239, 241, 156/230, 240, 344, 246, 249, 289, 254, 276, 291, 292, 298, 622, 59; 428/352, 325, 144, 156, 143, 202, 207, 241, 283, 208

[56] References Cited

U.S. PATENT DOCUMENTS

| | | | |
|---|---|---|---|
| 4,017,581 | 4/1977 | Amidon ................... | 156/234 |
| 4,027,345 | 6/1977 | Fujisawa et al. ........... | 156/234 |
| 4,075,049 | 2/1978 | Wood ..................... | 156/240 |
| 4,184,701 | 1/1980 | Franklin et al. ........... | 156/344 |
| 4,388,359 | 6/1983 | Ethen et al. .............. | 428/143 |
| 4,394,419 | 7/1983 | Shimizu et al. ............ | 156/254 |
| 4,418,110 | 11/1983 | May et al. ................ | 428/143 |
| 4,496,618 | 1/1985 | Pernicano ................. | 156/240 |

FOREIGN PATENT DOCUMENTS 55-9846  1/1980  Japan ..................... 156/230

Primary Examiner—Edward Kimlin
Assistant Examiner—L. Falasco
Attorney, Agent, or Firm—Morgan, Finnegan, Pine, Foley & Lee

[57] ABSTRACT

A method of transferring a retroreflective pattern onto a fabric, wherein a retroreflective pattern transfer sheet comprising a base film, a temporary holding adhesive, a mass of transparent fine glass spheres partially embedded into the temporary holding adhesive, and a reflective film layer which covers the exposed surface of the transparent fine glass spheres and the exposed surface of the temporary holding adhesive present in the gaps between individual adjacent transparent fine glass spheres, is superposed on the surface of a fabric coated with a compression bonding adhesive in a predetermined pattern, with the reflective film layer side put in contact with the fabric surface, the portion of the transfer sheet which is opposed to the compression bonding adhesive into bond with the fabric, an outer portion of the sheet is subsequently stripped off, whereby only the portion thereof which is in bond with the fabric through the compression bonding adhesive is allowed to remain on the fabric to form the retroreflective pattern with the individual transparent glass spheres present in partially exposed condition.

6 Claims, 2 Drawing Figures

METHOD OF TRANSFERRING A RETROREFLECTIVE PATTERN ONTO A FABRIC

BACKGROUND OF THE INVENTION

The present invention relates to a method of transferring to a retroreflective pattern onto a fabric.

A known method of the type comprises a step of superposing on the surface of a fabric a retroreflective pattern transfer sheet comprising a base film composed of a plastic film (e.g. polyester film) having a thickness of about 10–50μ, a mass of transparent fine glass spheres having a refractive index of 1.9 and a mesh size of 250–350, for example, and deposited on the base film, through a temporary holding (or peelable) adhesive composed of an epoxy resin having a dry thickness of about 8–15μ, in microscopically spaced apart relation so that they are more than half exposed, a reflctive film layer consisting of a transparent colored film having a thickness of about 1μ or less, for example, and a deposited metal film (e.g. aluminum) and laid over the exposed surface of the transparent fine glass spheres and over the surface of the adhesive present at gaps between adjacent transparent fine glass spheres, and a coat of a hot-melt adhesive laid over the reflective film layer to provide a substantially flat outer surface, said superposition being effected through said hot-melt adhesive, a step of pressing the retroreflective pattern transfer sheet from the base film side through a hot convex form having a predetermined pattern engraved thereon, thereby melting a hot-melt adhesive portion corresponding to the convex pattern so that the corresponding portion of the retroreflective pattern transfer sheet is deposited on the surface of the fabric, and a step of applying a peel force to the retroreflective pattern transfer sheet so that at gaps defined by individual transparent fine glass spheres along a border line between one portion of the transfer sheet which is in bond with the fabric surface and another portion which is not in bond with the fabric surface, the hot-melt adhesive and reflective film layer are scissioned so that at the portion in bond with the fabric surface the base film is peeled off together with the temporary holding adhesive, a mass of transparent fine glass spheres less than half exposed being thus retained, together with the associated reflective film layer, on the surface of the fabric to form a retroreflective pattern portion on the fabric and so that the portion of the transfer sheet which is not in bond with the fabric surface is peeled off in its entirety. (Japanese Patent Publication No. 357 of 1977.)

In this known method, as above described, the step of peeling the retroreflective pattern transfer sheet is carried out in such form that at gaps between transparent fine glass spheres the hot-melt adhesive layer is scissioned. However, the trouble is that the hot-melt adhesive layer at such portion is thicker than at the other portion of the retroreflective pattern transfer sheet, so that the step of scissioning cannot be smoothly carried out. In some cases, at a portion not in bond with the fabric surface the base film may be peeled off together with the temporary hold adhesive in same manner as at the portion in bond with the fabric surface, with the result that a somewhat deformed retroreflective pattern may be produced on the fabric.

Another difficulty with the known method is that the exposed surface area (exposed height or angle) of the transparent fine glass sphere that determines the luminance of the retroreflective pattern is governed by the depth to which the glass sphere is embedded into the temporary holding adhesive, which fact makes it practically impossible to vary the luminance of the retroreflective pattern, and more particularly to provide a retroreflective pattern having different luminant intensities as desired from the standpoint of visual richness.

OBJECTS OF THE INVENTION

Accordingly, it is a primary object of the invention to provide a method of transferring a retroreflective pattern onto a fabric wherein a retroreflective pattern transfer sheet is accurately and smoothly stripped off.

It is another object of the invention to provide a method of transferring a retroreflective pattern onto a fabric which permits the retroreflective pattern to provide different degrees of luminous intensity.

Other objects of the invention will become apparent from the following detailed description and illustrative examples taken in connection with the accompanying drawings.

DETAILED DESCRIPTION

Figure 1:
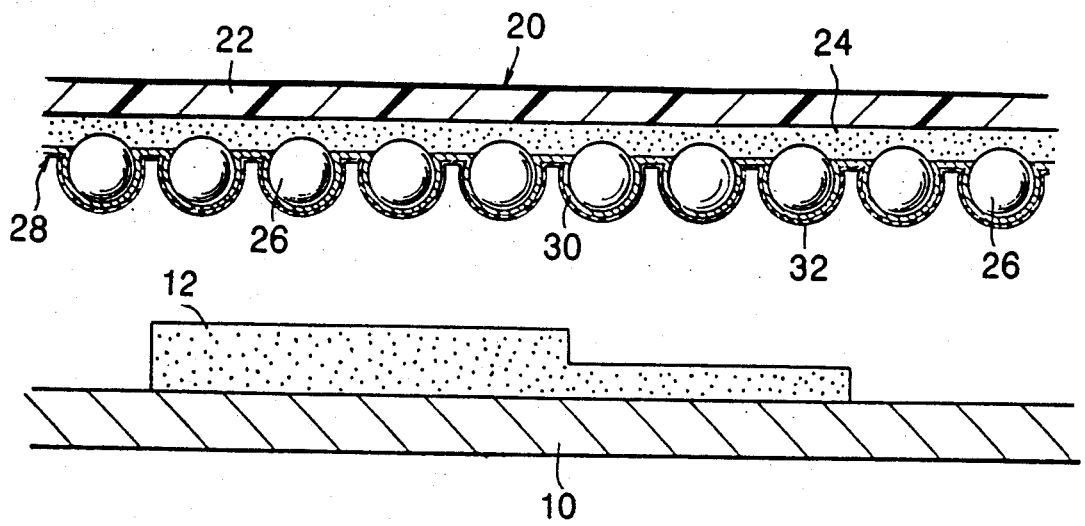
FIG. 1 is an enlarged partial view in section showing one embodient of the invention as it appears just before a retroreflective pattern transfer sheet is superposed on a fabric.
Figure 2:
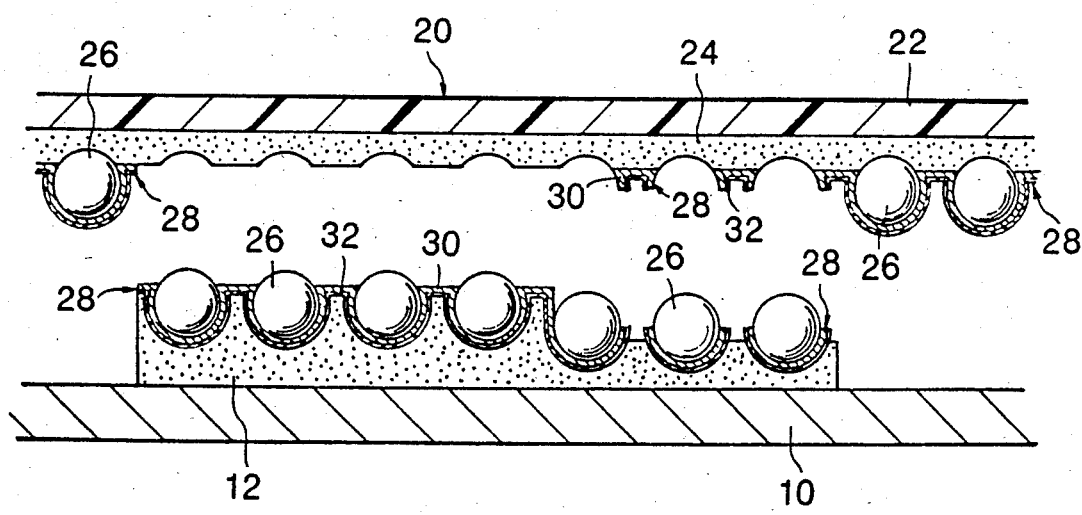
FIG. 2 is an enlarged partial view in section of the embodiment as it appears just after the retroreflective pattern transfer sheet is stripped off the fabric.

The method of transferring a retroreflective pattern onto a fabric according to the invention, as partially illustrated in FIGS. 1 and 2, comprises the steps of: coating a compression bonding adhesive 12 on the surface of the fabric 10 in a predetermined pattern, superposing on the surface of the fabric so coated with said adhesive 12 a retroreflective pattern transfer sheet 20 comprising a mass of transparent fine glass spheres 26 deposited in spaced apart relation on a base film 22 through the intermediary of a temporary holding adhesive 24 so as to allow the fine spheres 26 to be individually more than half exposed and a reflective film layer 28 composed of a colored transparent film 30 and a deposited metal film 32, which reflective film layer is laid over the exposed surface of said mass of transparent fine glass spheres 26 and over the surface of the temporary holding adhesive 24 present between the individual adjacent transparent glass spheres 26, with the reflective film side of said retroreflective pattern transfer sheet 220 to be put in face-to-face relation with the adhesive coated side of the fabric 10, applying pressure to the retroreflective pattern transfer sheet 20 superposed on the fabric 10 from the base film side, thereby bringing the retroreflective pattern transfer sheet 20 opposed to the pattern coat of the compression bonding adhesive 12 into bond with the surface of the fabric 10 through the compression bonding adhesive 12, applying a peel force to the retroreflective pattern transfer sheet 20 so that the reflective film layer 28 is scissioned at a gap defined by individual transparent fine glass spheres 26 present along a borderline between one portion of the transfer sheet 20 which is in bond with the fabrick 10 through the compression bonding adhesive 12—or the portion opposed to the compression bonding adhesive coat on the fabric 10—and another portion of the transfer sheet 20 which is not in bond with the fabric 10—or the portion opposed to a non-adhesive-coated portion of the fabric 10—and so that said portion of the transfer sheet 20 not in bond with the fabric 10 is stripped off, whilst at least the temporary holding adhesive 24 and the base film 22 are stripped off together from said portion in bond with the fabric 10 of the transfer sheet 20 so that a mass of transparent fine glass spheres 26, less than half exposed, and the associated reflective film layer 28 at least are retained as retroreflective pattern means on the surface of the fabric 10.

A patterned coating of the compression bonding adhesive 12 on the fabric 10 can normally be effected to a substantially uniform thickness or with some difference in thickness by manual brush coating or spray coating, or by employing such pattern coating system as roll coating or screen coating. Where some difference is given in coat thickness or where the overall coat thickness is made thin, and more particularly where an extra thin coat, e.g. less than the radius of the transparent fine glass sphere 26, is used, the retroreflective pattern will have a greater luminous intensity as will be described hereinafter. For the purpose of the compression bonding agent 12 it is possible to use any thermocompression bonding adhesive or pressure sensitive adhesive. Among preferred adhesives are saturated polyester resins dissolved in a mixture of a petroleum solvent and a cyclohexanone, and vinyl acetate resin emulsions.

The base film 22, temporary holding adhesive 24, transparent fine glass spheres 26, colored transparent film 30, and deposited metal film 32, as components of the retroreflective pattern transfer sheet 20, may be constructed of known manterials as such. That is, for the base film 22 may be normally used a plastic film having a thickness of about 10–50μ, and more particularly a polyester film having a thickness of about 12–15μ. For the purpose of the temporary holding adhesive 24, it is possible to use a silicone resin adhesive or epoxy resin adhesive having a dry thickness of about 8–15μ. For use as the transparent fine glass sphere is generally available one having a refractive index of 1.9 and a mesh size of 250–350. The colored transparent film 30, as a component of the reflective film layer 28, can be formed by coating a composition of materials such as solvent-based vinyl chloride resin, transparent pigment, and a colorant of a given color to a thickness less than about 1μ. The deposited metal film 32 can be formed by vacuum deposition of a metal such as aluminium.

Application of pressure on the retroreflective pattern transfer sheet 20 superposed on the fabric 10, against the fabric 10, can be effected by using a press roll or press plate, and also by using an electric iron. Naturally, if the compression bonding adhesive 12 is thermocompression bonding, it is necessary to employ a thermocompression means such as electric iron, so that heating can be effected simultaneously with pressing.

During the stage or pressing the retroreflective pattern transfer sheet 20, the portion thereof opposed to the compression bonding adhesive 12 is brought into bond with the fabric 10 through the intermediary of the compression bonding adhesive 12. Strictly speaking, if the coat thickness of the compression bonding adhesive 12 on the fabric 10 is such that, in the case of its being more than the diametral size of the transparent fine glass sphere, for example, the coat is more than sufficient to fill the gaps between individual adjacent transparent fine glass spheres 26 at the stage or pressing (see the lower left portion of FIG. 1), the compression bonding adhesive 12 goes in contact with all the deposited metal film 32 opposed thereto, and accordingly the entire portion of the transfer sheet as opposed to the compression bonding adhesive 12 having such thickness is in bond with the fabric 10. If, as in the case where the thickness of such coat is less than the radial length of the transparent fine glass sphere, for example, the compression bonding adhesive 12 is substantially less than sufficient to fill the gaps between individual transparent fine glass spheres 26 (see the lower right portion of FIG. 1), the surface of the adhesive 12 does not go in contact with the deposited metal film 32 of the reflective film layer 28, and accordingly the reflective film layer 28 is in bond with the fabric, with the exception of such gap portions.

Peeling of the retroreflective pattern transfer sheet 20, subsequent to the pressing thereof against the fabric 10, can be carried out either manually or mechanically.

During such peeling or stripping-off stage, the portion of the transfer sheet that is opposed to the fabric portion on which no compression bonding adhesive 12 is present is entirely stripped off, whereas at gaps between individual transparent glass spheres 26 present along a border line defined between the fabric-transfer sheet bonded portion and the fabric-transfer sheet non-bonded portion the reflective film 28 is scissioned. Further, at a bonded portion where the transfer sheet is opposed to the fabric portion coated with the compression bonding adhesive 12, and where the adhesive 12 has a larger coat thickness, the base film 22 and the temporary holding adhesive 24 are peeled off, if the transfer sheet, including the reflective film 28, is entirely in bond with the fabric 10, so that the individual transparent fine glass spheres 26 are exposed at their respective portions which have previously been embedded in the temporary holding adhesive 24, a retroreflective pattern being thus formed as such on the fabric (see the lower left portion of FIG. 2). Where the coat of the compression bonding adhesive 12 is so thin that at the gaps between adjacent transparent fine glass spheres 26 the reflective film 28 is not in bond with the fabric through the adhesive 12 (see FIG. 12, lower right portion), the reflective film layer 28 is stripped off together with the base film 22 and temporary holding adhesive 24 while being scissioned at said gaps. Thus, a retroreflective pattern portion is formed which has a higher luminance capability, with the transparent fine glass spheres 26 exposed more than they have previously been embedded in the temporary holding adhesive 24.

As may be clearly understood from the above description, according to the method of the invention, only the extra thin reflective film layer portion of the retroreflective pattern transfer sheet is scissioned at the stripping-off stage, which fact permits accurate and smooth peeling of the transfer sheet so that the predetermined retroreflective pattern can be produced on the fabric.

Further, according to the method of the invention, it is possible to vary the luminous intensity of the retroreflective pattern according to the coat thickness of the compression bonding adhesive on the fabric, that is, by effecting the coating of the compression bonding adhesive on the fabric surface, during the stage of pressure application, to different thicknesses such that a part of the adhesive coat is more than sufficient to fill the gaps between individual adjacent transparent fine glass spheres, the remaining part thereof being substantially less than sufficient to fill such gaps. Accordingly, it is possible to produce a retroreflective pattern having different degrees of luminous intensity.

The following two examples are given to aid in the understanding of the invention.

EXAMPLE 1

On the surface of a scoured silk fabric was coated a compression bonding adhesive consisting of a 25% colored vinyl acetate resin emulsion in a predetermined pattern by using a brush, with a variation in coat thickness, and dried in air.

On a polyester film having a thickness of 12μ was applied a peelable silicone resin coat, as a temporary holding adhesive, so that the dry thickness of the coat would be 10μ. When the silicone resin coat was half dried, transparent fine glass spheres of 325 mesh were sprayed over the coat so that they would be embedded into the silicone resin about one third of their diameter. Then, a solvent-based vinyl chloride resin having a solids content of 20%, added with a transparent pigment and a red colorant, was coated thereover by using a doctor knife to form a colored transparent film layer. Thereon was further laid an aluminum deposited film by vacuum deposition, and a retroreflective pattern transfer sheet was thus obtained. The transfer sheet so obtained was superposed on the silk fabric so that the deposited film side of the transfer sheet was brought in contact with the fabric. The superposed assembly was then subjected to pressure while being heated by an electric iron on the polyester film side.

Subsequently, a peel force was manually applied to the retroreflective pattern transfer sheet sequentially from one end thereof, with the result that on the vinyl acetate resin emulsion coat of the silk fabric there was present a retroreflective pattern with individual fine glass spheres partially exposed. Between the thick vinyl-acetate resin emulsion coated portion and the thin coated portion there was found a difference in luminous intensity such that the latter portion had a greater exposed area of transparent fine glass spheres and a greater luminous intensity.

EXAMPLE 2

On the surface of a white cotton fabric was coated a compression bonding adhesive composed of a saturated polyester resin which was dissolved in a mixture of a petroleum solvent and a cyclohexanone so that the adhesive had a solids content of 15%, in a gradated pattern by using a spray gun. Subsequently, on the surface of the cotton fabric was superposed a retroreflective pattern transfer sheet identical with the one used in Example 1, with the aluminum deposited film side of the transfer sheet placed in face-to-face relation with the fabric.

Then, the transfer sheet was subjected to pressure while being heated by means of an electric iron from the polyester film side; and thereafter it was subjected to a peel force. On the cotton fabric was thus obtained a gradated retroreflective pattern with individual fine glass spheres partially exposed. A variation in luminous intensity similar to the one witnessed in Example 1 was seen in this case, too, according to the thickness of the compression bonding adhesive coat.

What is claimed is:

1. A method of transferring a retroreflective pattern onto a fabric, which comprises the steps of: coating a compression bonding adhesive on a surface of the fabric in a predetermined adhesive pattern, superposing on the surface of the fabric so coated with said adhesive a retroreflective pattern transfer sheet comprising a mass of transparent fine glass spheres deposited in spaced apart relation on a base film through an intermediary of a temporary holding adhesive so as to allow the fine spheres to be individually more than half exposed and a reflective film layer composed of a colored transparent film and a deposited metal film, which reflective film layer is laid over the exposed surface of said mass of transparent fine glass spheres and over the surface of the temporary holding adhesive present between individual adjacent glass spheres, with the reflective film side of said retroreflective pattern transfer sheet placed in face-to-face relation with the adhesive coated side of the fabric, applying pressure to the retroreflective pattern transfer sheet superposed on the fabric from the base film, thereby bringing the retroreflective pattern transfer sheet opposed to the pattern coat of the compression bonding adhesive into bond with the surface of the fabric through the compression bonding adhesive, applying a peel force to the retroreflective pattern transfer sheet so that the reflective film layer is scissioned at a gap defined by individual transparent fine glass spheres present along a borderline between a first portion of the transfer sheet which is in bond with the fabric through the compression bonding adhesive and a second portion of the transfer sheet including the area of the color transparent film and metal film between the spheres which is not in bond with the fabric and so that said portion of the transfer sheet not in bond with the fabric is stripped off, whilst at least the temporary holding adhesive and the base film are stripped off together from said portion in bond with the fabric of the transfer sheet so that a mass of transparent fine glass spheres, less than half exposed, and the associated reflective film layer at least are retained as retroreflective pattern means on the surface of the fabric the thickness of the adhesive coat being more than sufficient to fill the gaps between individual adjacent transparent fine glass spheres.

2. The method according to claim 1 wherein coating of the compression bonding adhesive on the surface of the fabric is effected during the stage of applying pressure to the retroreflective pattern transfer sheet.

3. The method according to claim 1 wherein coating of the compression bonding adhesive on the surface of the fabric is effected during the stage of applying pressure to the retroreflective pattern transfer sheet and to a thickness such that said adhesive coat is substantially less than sufficient to fill the gaps between individual adjacent transparent fine glass spheres.

4. The method according to claim 1 wherein coating of the compression bonding adhesive on the surface of the fabric is effected during the stage of applying pressure to the retroreflective pattern transfer sheet and to different thicknesses such that a part of said adhesive coat is more than sufficient to fill the gaps between individual adjacent transparent fine glass spheres, the remaining part thereof being substantially less than sufficient to fill such gaps.

5. The method according to claim 1, 2, 3 or 4 wherein the compression bonding adhesive is a thermocompression bonding adhesive.

6. The method according to claim 1, 2, 3 or 4 wherein the compression bonding adhesive is a pressure sensitive adhesive.

* * * * *